Dec. 2, 1924.
W. A. VAN BRUNT
DRIVING MECHANISM FOR SEEDING MACHINES
1,517,268
Original Filed June 10, 1918
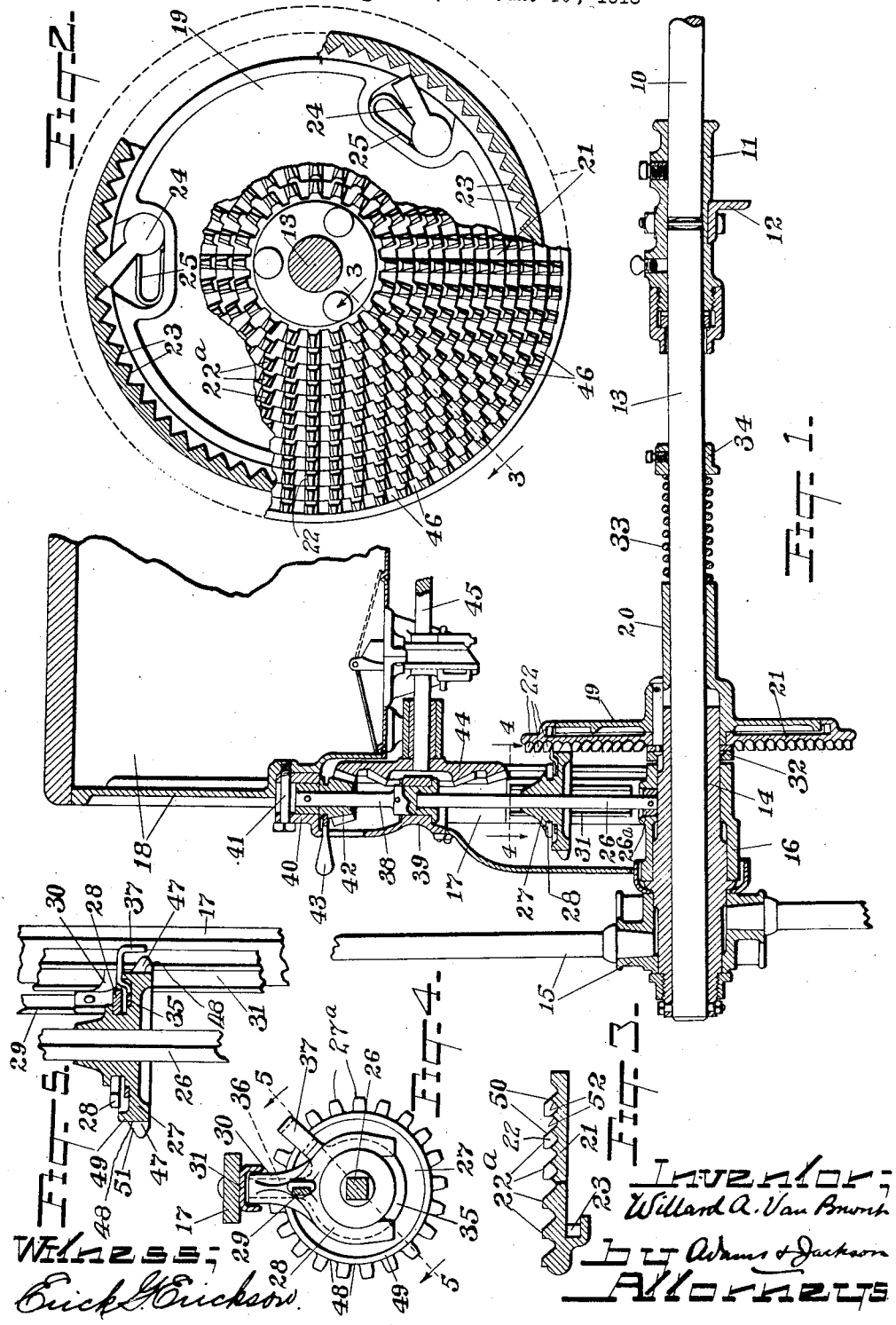

Patented Dec. 2, 1924.

1,517,268

UNITED STATES PATENT OFFICE.

WILLARD A. VAN BRUNT, OF LOS ANGELES, CALIFORNIA, ASSIGNOR TO VAN BRUNT MANUFACTURING COMPANY, OF HORICON, WISCONSIN, A CORPORATION OF WISCONSIN.

DRIVING MECHANISM FOR SEEDING MACHINES.

Original application filed June 10, 1918, Serial No. 239,109. Divided and this application filed September 4, 1920. Serial No. 408,211.

*To all whom it may concern:*

Be it known that I, WILLARD A. VAN BRUNT, a citizen of the United States, and a resident of Los Angeles, in the county of Los Angeles, in the State of California (formerly of Horicon, Wisconsin), have invented certain new and useful Improvements in Driving Mechanisms for Seeding Machines, of which the following is a specification, reference being had to the accompanying drawings.

My invention relates to variable speed driving mechanisms for seeding machines of the type adapted for planting wheat, rye, barley, oats and the like. In the operation of mechanisms of this type, it is important that whatever speed be employed the seed dispensing parts be driven smoothly and evenly without vibration or lost motion in order that the flow of seed to the soil shall be even and uniform. In this way an even spacing of the seed in the soil will be attained, assuring the maximum crop return. To this end it is the object of my invention to provide a new and improved form and arrangement of parts by which the maximum of efficiency will be secured in the delivery of the seed to the soil and by which a strong and durable construction will be attained.

This application is filed as a division of my application Serial No. 239,109, for improvements in seeding machines filed June 10, 1918.

The preferred means by which I have accomplished my objects are illustrated in the drawings and are hereinafter specifically described. That which I desire to cover by this application is set forth in the claims.

In the drawings,—

Fig. 1 is a transverse vertical section through one side of a seeding machine, certain of the parts being broken away;

Fig. 2 is a face view of the gear mounted upon the axle by which the driving mechanism is driven, a part of the disc being broken away in order better to show the construction;

Fig. 3 is a cross-section taken on line 3—3 of Fig. 2;

Fig. 4 is an enlarged detail being a horizontal cross-section taken on line 4—4 of Fig. 1; and Fig. 5 is a section taken on line 5—5 of Fig. 4.

Referring to the several figures of the drawings in which corresponding parts are indicated by the same reference characters,— 10 indicates one end portion of a dead axle which is connected by means of a socket member 11 with a forwardly-extending frame-bar 12. A live axle 13 is revolubly mounted in the socket member 11 substantially in alinement with the dead axle 10, the axle member 13 having a driving sleeve 14 fixedly mounted upon its outer end. A wheel 15, only a fragmentary portion of which is illustrated, is fixedly mounted upon the driving sleeve 14 in any suitable manner. The driving sleeve 14 is journaled in a sleeve or boxing 16 which has suitable connection with the framework of the machine, as will be readily understood. A vertical frame-bar 17 rises from the box 16, and a longitudinally-extending seed hopper 18 of any approved type is supported above the axle.

A driving plate 19 is mounted by means of a sleeve 20 upon the axle member 13, the outer end of the sleeve 20 being enlarged to embrace the inner end of the driving sleeve 14. The sleeve 20 is mounted so as to be movable longitudinally of the axle member 13 and of the driving sleeve 14 but so as to rotate therewith. Revolubly mounted upon the outer end of the sleeve 20 adjacent to the driving plate 19 is a large gear 21 which is in the form of a disk provided on its outer face with a plurality of sets of concentric teeth 22. Upon its inner face, the gear 21 is provided with ratchet teeth 23 which are adapted to be engaged by pawls 24 which are pivotally mounted in suitable pockets or recesses in the periphery of the driving plate 19. Springs 25 serve to hold the pawls 24 normally projected beyond the periphery of the plate 19 so as to engage the ratchet teeth 23 of the gear. I have provided three of the pawls 24 for driving the gear 21, so positioned that when one of the pawls is in engagement with a ratchet tooth, the other two pawls stand in intermediate positions between the teeth, thus making the pawls 24 quick to respond to the forward movement of the plate 19 for giving a corresponding movement to the gear 21. At the same time the plate 19 is free to move backwards with respect to the gear 21 without any tendency to drive the gear, whereby the machine may be turned or backed without a corresponding backward movement of the gear 21.

Extending along the outer face of the gear 21 is a square shaft 26 which is mounted at one end in a button bushing 26ª which in turn has a suitable bearing in the box or sleeve 16. Slidably mounted upon the shaft 26 is a pinion 27 which is adapted to mesh with any one of the plurality of concentric series of teeth 22 of the gear 21. Means is provided for moving the pinion 27 vertically along the shaft 26, comprising a yoke 28 and a bar 29 rising therefrom. The bar 29 is adapted to be held by the use of any suitable mechanism, not shown, in any adjusted position as may be desired for controlling the vertical position of the pinion 27, the yoke 28 being in engagement with a circumferential groove in the said pinion, as is best shown in Fig. 5. An arm 30 extending forwardly from the yoke 28 engages a guide in the form of a channel bar 31 carried by the frame-bar 17 for holding the yoke 28 in suitable position.

When it is desired to throw the gear 21 and pinion 27 out of operative engagement, this can be accomplished by moving the gear 21 toward the right as viewed in Fig. 1 along the axle member 13. For accomplishing this result I have provided a collar 32 which may be manipulated in any suitable manner for effecting the desired result. The movement of the gear 21 toward the right as viewed in Fig. 1 is opposed by a coiled spring 33 mounted upon the axle member 13 between the sleeve 20 and a collar 34 mounted on said axle member which spring holds the gear 21 yieldingly in engagement with the pinion 27. As will be readily understood, the gear 21 may be thrown out of operative position when the pinion 27 is to be moved to an adjusted position.

I have provided an automatically acting safety device for preventing the rotation of the pinion 27 in a reverse direction. This means comprises a collar 35 mounted upon the hub of the pinion 27 (see Fig. 5) so as to have frictional engagement therewith. The collar 35 is provided with an arm 36 extending from one side thereof into the channel 31 and a second arm 37 extending to a point substantially opposite to the teeth of the pinion 27. The arm 36 is of a smaller width than the channel 31, whereby the collar 35 is permitted to have a slight rocking movement about the axis of the pinion 27. When the pinion 27 is being driven in its normal forward direction, which is in counterclockwise direction as viewed in Fig. 4, the collar 35 will stand at the limit of its motion in counterclockwise direction as viewed in said figure with the arm 36 in contact with the left hand flange of the channel 31 as illustrated in said figure. With the collar in this position the arm 37 is held out of contact with the gear 21. When, however, the gear 27 is given a very slight movement in a reverse direction, the arm 36 is quickly moved into contact with the opposite flange of the channel 31, serving to throw the arm 37 into engagement with the teeth of the gear 21 so as to prevent reverse rotation of such gear. By this construction, the seed delivering mechanism is protected against movement in a reverse direction even though the pawls 24 should fail to function properly.

As is best shown in Fig. 1, the upper end of the shaft 26 is mounted in a socket in the lower end of a short shaft 38 which is journaled in a bearing 39 carried by the framework. The socket in the shaft 38 in the construction shown is square in cross section to suit the shape of the shaft 26, and is rounded in vertical section so as to form substantially a universal joint with the shaft 26. The shafts 26 and 38 thus constitute in effect a single shaft, the upper end portion of which may be deflected laterally with relation to the lower portion thereof. The upper end of the shaft 38 is mounted in a suitable bearing 40 which is secured by means of a bolt 41 to the end of the hopper 18. A bevel pinion 42 is mounted on the shaft 38 so as to rotate therewith and to move longitudinally thereof, and is adjustably held in position by means of a latch device 43 of any suitable type. A bevel gear 44 is mounted upon a seed delivery shaft 45 so as to rotate with said shaft, said gear, in the construction shown, being provided with two sets of concentric teeth with either of which the pinion 42 is adapted to mesh for driving the shaft 45. When it is desired to adjust the position of the pinion 42, the bolt 41 is loosened so that the bearing 40 may be moved toward the left as viewed in Fig. 1 to free the pinion from the gear teeth. After the desired change of position of the pinion 42 has been made by the use of the latch 43, the bolt 41 will be again tightened. Any suitable mechanism operated by the seed delivery shaft 45 to dispense the seed from the hopper 18 may be provided and inasmuch as the seed dispensing mechanism forms no part of my present invention, it is believed to be unnecessary to describe the same herein. It will be understood of course that mechanism as above described is provided at both ends of the machine, and consequently, when the machine moves forward, motion is transmitted from the ground wheels to the gears 21, and from them through the intermediate gearing to the ends of the shaft 45. By the construction described, therefore, two variable speed mechanisms are provided between the shafts 13 and the seed distributing devices.

As any slipping, chattering or grinding action between the teeth of the gear 21 and those of the pinion 27 shorten their life and also cause jerking, trembling and vibrating of the seed dispensing mechanisms and thus prevent the desired uniformity of delivery and even spacing of the seed kernels in the soil, I have departed from the usual design and have provided drive gearing having peculiarly formed teeth, whereby a smooth running roller like effect is produced, and whereby a very strong and durable construction is attained. For attaining my desired results, the extremities of the teeth 22 are made flat forming faces or areas 22ª perpendicular to the axis of the gear 21, and between the teeth in each row are flat areas 46 parallel with the flat areas of the teeth. The extremities of the teeth 47 of the pinion 27 have circumferential faces or areas 27ª that roll against the areas 46 of the gear 21, and between the bases of the teeth 47 are circumferential areas 48 parallel with the axis of the pinion and extending the length of the tooth base, as best shown in Fig. 5, against which circumferential areas the areas 22ª of the teeth 22 roll. In this manner a continuous rolling contact is provided between the gear 21 and pinion 27 whereby the desired smooth, even operation is effected.

If desired a flange or face 49 may be formed around the entire periphery of the pinion 27 concentric with the areas 48, so that it overlies and is adapted to have rolling engagement with the flat faces of the row of teeth 22 next to the row being engaged by the teeth of the pinion 27. As is best shown in Fig. 3 the inner faces of the teeth 22 are sloped outwardly at substantially 45 degrees with respect to the plane of the gear, as indicated at 50, and the outer faces of the teeth 47 are likewise given a slope of approximately 45 degrees as is indicated at 51 in Fig. 5. By reason of this formation the teeth are adapted to clear each other freely. As best shown at the right in Fig. 3, concentric inclined surfaces 52 are provided at the inner and outer sides of the flat areas 46, which converge inwardly or toward such areas forming concentrically disposed approximately V-shaped recesses between consecutive teeth 22 of the same row, which recesses conform to the inclination of the inner and outer faces at the end portions of the teeth 47 of the pinion 27. These recesses serve to center the teeth of the pinion in the row of teeth 22 in which they are operating, and tend to prevent accidental radial movement of said pinion, thereby ensuring proper contact between the coacting surfaces.

By the use of the button-bushing 26ª for providing the lower bearing for the shaft 26, I have provided a means whereby a repair can be made readily and at small expense when the bushing becomes worn due to the side thrust thereon of the spring 33. By the simple replacement of a new bushing in lieu of a worn one, the bearing is easily maintained in order.

What I claim as my invention and desire to secure by Letters Patent, is,—

1. A driving mechanism comprising a gear in the form of a disk having a plurality of sets of teeth arranged in concentric rows, said teeth being flat at their outer ends and the teeth of the same row being separated by flat areas, a pinion having radially extending teeth adapted to mesh with the teeth of said rows, the teeth of said pinion being separated by circumferential areas and having circumferential areas at their ends, and recesses in said gear tending to prevent accidental radial movement of said pinion, the end faces of the teeth of said gear and pinion being arranged each to have rolling engagement with the areas between the teeth of the other.

2. A driving mechanism comprising a gear in the form of a disk having a plurality of sets of teeth arranged in concentric rows, said teeth being flat at their outer ends and the teeth of the same row being separated by flat areas, said gear having inclined surfaces at the inner and outer sides of said areas, forming concentrically disposed V-shaped recesses between consecutive teeth of the same row, and a pinion having radially extending teeth adapted to mesh with the teeth of said rows, the teeth of said pinion being separated by circumferential areas and having circumferential areas at their ends and inclined inner and outer faces adapted to conform to the inclined surfaces of said recesses, whereby said recesses tend to prevent accidental radial movement of said pinion, the end faces of the teeth of said gear and pinion being arranged each to have rolling engagement with the areas between the teeth of the other.

3. A driving mechanism for seeding machines comprising a gear having a plurality of sets of teeth arranged concentrically thereon, and a second gear having operative engagement with one of said sets of teeth of said first-named gear and rolling engagement with another of said sets of teeth.

4. A driving mechanism for seeding machines comprising a gear in the form of a plate having a plurality of sets of teeth arranged concentrically and extending longitudinally of the axis about which the gear rotates, and a second gear having operative engagement with one of said sets of teeth of said first-named gear and rolling engagement with another of said sets of teeth.

5. A driving mechanism for seeding machines comprising a gear having a plurality of sets of teeth arranged concentrically thereon, and a second gear having a set of radially-disposed teeth adapted operatively to engage one of the sets of teeth of said first-named gear, said second gear having a smooth face portion alongside of the teeth thereon adapted to have rolling engagement with another of said sets of teeth on said first-named gear.

6. A driving mechanism for seeding machines comprising a stationary bearing sleeve, a traction driven rotary sleeve journaled in said stationary sleeve, an axle member mounted in said rotary sleeve and non-rotatably connected therewith, a shaft arranged at an angle to said axle and having a bearing in one side of said stationary sleeve, and driving connections between said axle and said shaft.

7. A driven mechanism for seeding machines comprising an axle, substantially alined shafts operatively connected together, variable speed driving connections between said axle and one of said shafts, concentric bevel gears at the same side of the other shaft, and a bevel pinion mounted on the latter shaft and movable into operative engagement with either of said bevel gears.

8. A driving mechanism for seeding machines comprising an axle, a shaft, variable speed driving connections between said axle and said shaft, a seed delivery shaft, concentric bevel gears carried by the latter shaft, and a bevel pinion carried by said first-mentioned shaft and movable into operative engagement with either of the bevel gears carried by said seed delivery shaft.

9. A driving mechanism for seeding machines comprising an axle, a shaft, variable speed driving connections between said axle and said shaft, a second shaft normally in substantial alinement with said first-mentioned shaft, a bevel pinion slidably mounted on said second shaft and adapted to be rotated thereby, a bevel gear having a plurality of sets of teeth concentrically arranged, a shaft on which said bevel gear is mounted, and driving connections between said first-mentioned shafts adapted to permit lateral deflection of said second shaft, whereby said bevel pinion is adapted to be placed in mesh with any one of the sets of teeth on said bevel gear.

10. A driving mechanism for seeding machines comprising an axle, a shaft, variable speed driving connections between said axle and said shaft, a second shaft having a socket in one end adapted to have a working fit upon the end of said first-named shaft so as to permit a slight variation in alinement of said two shafts while being adapted to cause said shafts to rotate in unison, adjustable means for holding said second shaft in operative position, a bevel gear having a plurality of sets of teeth concentrically arranged, a seed delivery shaft on which said bevel gear is mounted, and a bevel pinion slidably mounted on said second shaft and adapted to be rotated thereby, said bevel pinion being adapted to be placed in mesh with any one of the sets of teeth of said bevel gear for varying the speed of said seed delivery shaft independently of said first-named variable speed connections.

11. In a seeding machine, the combination of a stationary bearing sleeve, a driving sleeve rotatably mounted therein, an axle mounted in said driving sleeve, a gear slidably mounted on said axle, a bushing revolubly mounted in a socket in one side of said bearing sleeve, a shaft mounted in said bushing and extending across the face of said gear, a pinion slidably mounted on said shaft and meshing with said gear, and a spring holding said gear yieldingly in mesh with said pinion.

12. A seeding mechanism comprising a seed shaft, means for driving said seed shaft, and a frictionally-mounted device adapted to be held yieldingly in inoperative position while said driving means is driving said seed shaft in its normal direction but adapted when the driving means is rotated in the opposite direction to be moved by friction into operative position for preventing reverse rotation of said seed shaft.

13. A seeding mechanism comprising a seed shaft, a rotary member for driving said seed shaft, a plate frictionally-mounted on said rotary member, and means adapted upon a slight rotary movement of said plate with said rotary member in a reverse direction to prevent further backward movement of said rotary member.

14. A seeding mechanism comprising a seed shaft, a gear for driving said seed shaft, and a frictionally-mounted device adapted to be held yieldingly in inoperative position while said gear is driving said seed shaft in its normal direction but adapted when the gear is given a slight rotary movement in the reverse direction to be moved by friction into engagement with said gear for preventing further reverse rotation thereof.

15. A seeding mechanism comprising a seed shaft, means for driving said seed shaft, a device frictionally mounted upon a rotary part of said driving means, a stop for limiting the rotary movement of said device in one direction, and means carried by said device adapted to prevent reverse rotation of said rotary part when moved by frictional engagement therewith slightly out of contact with said stop.

16. A seeding mechanism comprising a seed shaft, a pair of intermeshing gears for driving said seed shaft, and a device frictionally mounted on one of said gears adapted to be brought into position by a slight movement of said gear in reverse direction for engaging the other of said gears for preventing reverse rotation thereof.

WILLARD A. VAN BRUNT.